(12) United States Patent
Sahrhage et al.

(10) Patent No.: US 12,162,200 B2
(45) Date of Patent: Dec. 10, 2024

(54) INSTALLATION FOR PRODUCING A POLYMER MELT AND USE OF SUCH AN INSTALLATION FOR PRODUCING A POLYMER MELT FOR A POROUS FILM

(71) Applicant: BRÜCKNER MASCHINENBAU GmbH, Siegsdorf (DE)

(72) Inventors: Torsten Sahrhage, Unterwössen (DE); Benjamin Marey, Stephanskirchen Sim (DE); Stefan Seibel, Bad Reichenhall (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 207 days.

(21) Appl. No.: 16/991,557

(22) Filed: Aug. 12, 2020

(65) Prior Publication Data

US 2021/0046689 A1 Feb. 18, 2021

(30) Foreign Application Priority Data

Aug. 14, 2019 (DE) .................... 10 2019 121 854.3

(51) Int. Cl.
*B29C 48/00* (2019.01)
*B29B 7/00* (2006.01)
(Continued)

(52) U.S. Cl.
CPC ............ *B29C 48/387* (2019.02); *B29B 7/485* (2013.01); *B29B 7/488* (2013.01); *B29B 7/726* (2013.01);
(Continued)

(58) Field of Classification Search
None
See application file for complete search history.

(56) References Cited

U.S. PATENT DOCUMENTS 2,948,928 A * 8/1960 Ebneth .................... B29C 44/10
521/917
5,310,513 A * 5/1994 Yamamoto ............ B29C 44/505
264/55
(Continued)

FOREIGN PATENT DOCUMENTS

CN 103302838 A 9/2013
DE 3133647 3/1983
(Continued)

OTHER PUBLICATIONS

DE3712749C1 (Mueller) Apr. 1988(online machine translation), [Retrieved on May 12, 2022]. Retrieved from: Espacenet (Year: 1988).*

(Continued)

*Primary Examiner* — Seyed Masoud Malekzadeh
*Assistant Examiner* — Andres E. Behrens, Jr.
(74) *Attorney, Agent, or Firm* — Nixon & Vanderhye P.C.

(57) ABSTRACT

An installation for producing a polymer melt for a porous film, in particular for a membrane film, comprises a planetary roller extruder. Said extruder is used to produce a flowable polymer melt from thermoplastics. The planetary roller extruder has a filling opening and a discharge side for delivering the polymer melt. A melt pump is further provided. The discharge side of the planetary roller extruder is connected to a downstream inlet side of the melt pump for further conveying the polymer melt. The connection is in the form of a pressure channel shielded from the ambient atmosphere or a pressure line shielded from the ambient atmosphere. The planetary roller extruder and the melt pump are designed and/or can be driven in such a manner that the polymer melt is applied or can be transferred under pressure at the melt pump on the inlet side.

21 Claims, 4 Drawing Sheets

(51) Int. Cl.
| | |
|---|---|
| *B29B 7/48* | (2006.01) |
| *B29B 7/52* | (2006.01) |
| *B29B 7/56* | (2006.01) |
| *B29B 7/58* | (2006.01) |
| *B29B 7/60* | (2006.01) |
| *B29B 7/62* | (2006.01) |
| *B29B 7/72* | (2006.01) |
| *B29B 7/82* | (2006.01) |
| *B29B 7/84* | (2006.01) |
| *B29B 7/86* | (2006.01) |
| *B29C 48/08* | (2019.01) |
| *B29C 48/25* | (2019.01) |
| *B29C 48/375* | (2019.01) |
| *B29C 48/38* | (2019.01) |
| *B29C 48/44* | (2019.01) |
| *B29C 48/58* | (2019.01) |
| *B29C 48/82* | (2019.01) |
| *B29C 48/91* | (2019.01) |
| *B29C 48/92* | (2019.01) |
| *H01M 50/00* | (2021.01) |
| *H01M 50/403* | (2021.01) |
| *H01M 50/414* | (2021.01) |

(52) U.S. Cl.
CPC .............. *B29B 7/823* (2013.01); *B29B 7/845* (2013.01); *B29B 7/86* (2013.01); *B29C 48/08* (2019.02); *B29C 48/44* (2019.02); *B29C 48/92* (2019.02); *B29C 2948/92514* (2019.02); *B29C 2948/92704* (2019.02)

(56) References Cited

U.S. PATENT DOCUMENTS

| | | | | |
|---|---|---|---|---|
| 5,360,329 | A | 11/1994 | Lemelson | |
| 5,889,064 | A * | 3/1999 | Herrmann | B29C 44/461 |
| | | | | 521/142 |
| 6,780,271 | B1 * | 8/2004 | Burmeister | B29B 7/485 |
| | | | | 156/244.11 |
| 11,781,254 | B2 * | 10/2023 | Sasai | B29C 48/05 |
| | | | | 442/400 |
| 2004/0260001 | A1 | 12/2004 | Lin et al. | |
| 2008/0093763 | A1 * | 4/2008 | Mancosh | B29C 48/67 |
| | | | | 264/211 |
| 2008/0290538 | A1 * | 11/2008 | Biesenberger | B29C 48/92 |
| | | | | 425/149 |
| 2009/0080282 | A1 * | 3/2009 | Skibba | B29B 7/603 |
| | | | | 366/76.2 |
| 2009/0212457 | A1 * | 8/2009 | Barakat | B29C 48/10 |
| | | | | 425/149 |
| 2010/0168409 | A1 * | 7/2010 | Fujita | B29C 48/625 |
| | | | | 536/58 |
| 2012/0077890 | A1 * | 3/2012 | Mancosh | B29B 17/0412 |
| | | | | 524/427 |
| 2013/0229888 | A1 * | 9/2013 | Asagiri | B29C 48/387 |
| | | | | 366/77 |
| 2014/0224749 | A1 * | 8/2014 | Hopkins | B01D 29/6469 |
| | | | | 210/791 |
| 2018/0001532 | A1 * | 1/2018 | Lythgoe | B29B 9/065 |

FOREIGN PATENT DOCUMENTS

| | | | |
|---|---|---|---|
| DE | 3242641 | 6/1983 | |
| DE | 3712749 C1 * | 4/1988 | ......... B29C 44/3442 |
| DE | 37 12749 | 7/1988 | |
| DE | 103 34 363 | 8/2004 | |
| DE | 10 2004 034 039 A1 | 2/2006 | |
| DE | 10 2005 051 341 | 4/2007 | |
| DE | 10 2015 008 406 | 4/2017 | |
| DE | 10 2016 002 143 | 8/2017 | |
| DE | 10 2017 214 850 | 2/2019 | |
| EP | 1 056 584 | 12/2006 | |
| EP | 2 039 492 | 9/2008 | |
| EP | 3 281 767 | 2/2018 | |
| GB | 2 204 524 | 11/1988 | |
| JP | 11-216765 A | 8/1999 | |
| JP | 2002-503567 A | 2/2002 | |
| JP | 2013-522379 A | 6/2013 | |
| JP | 2014-193604 A | 10/2014 | |
| JP | 2017-086083 A | 5/2017 | |
| JP | 2017-154469 A | 9/2017 | |
| WO | 2017/001048 | 1/2017 | |
| WO | 2019038142 A1 | 2/2019 | |
| WO | WO-2019038140 A1 * | 2/2019 | ............. B29B 7/485 |

OTHER PUBLICATIONS

Contributors to Wikimedia projects. (Oct. 27, 2019). Pressure angle. Wikipedia. https://web.archive.org/web/20191027115825/https://en.wikipedia.org/wiki/Pressure_angle (Year: 2019).*
B.G. (Jan. 31, 2002). Worm and Worm Gears. Boston Gear. https://www.bostongear.com/-/media/Files/Literature/Brand/boston-gear/catalogs/p-1930-bg-sections/p-1930-bg_engineering-info-worms-and-worm-gears.ashx (Year: 2002).*
WO-2019038140-A1 (Massow) Feb. 2019(online machine translation), [Retrieved on May 12, 2022]. Retrieved from: Espacenet (Year: 2019).*
DE3712749C1—(Mueller) Apr. 1987(updated online machine translation), [Retrieved on Dec. 19, 2022]. Retrieved from: Espacenet (Year: 1987).*
All About Plastics—Polyurethane (PU) and Thermoplastic Polyurethane (TPU). www.tudosobreplasticos.com/en/materiais/pu.asp. posted in Oct. 2, 2014, Daniel Tietz Rod (Year: 2014).*
https://www.michael-smith-engineers.co.uk/resources/useful-info/external-gear-pumps (Year: 2018).*
Wikipedia's Article on Bernoulli's_principle, Jul. 5, 2019, https://web.archive.org/web/20190705052922/https://en.wikipedia.org/wiki/Bernoulli's_principle. (Year: 2019).*
Office Action for Japanese Application No. 2020-136135, and English translation, twelever (12) pages, dated Nov. 29, 2023.
Search Report for Chinese Application No. 202010809808, two pages, dated Dec. 9, 2023.

* cited by examiner

INSTALLATION FOR PRODUCING A POLYMER MELT AND USE OF SUCH AN INSTALLATION FOR PRODUCING A POLYMER MELT FOR A POROUS FILM

This application claims priority to DE Patent Application No. 10 2019 121 854.3 filed Aug. 14, 2019, the entire contents of which are hereby incorporated by reference.

The invention relates to an installation for producing a polymer melt for porous films, in particular in the form of membrane films, and to the use of such an installation for producing a polymer melt for such a porous film, in particular in the form of a membrane film.

For the production of stretched porous films, such as membrane films for filtration, desalination, but also in the form of separator films/barrier films for batteries, such as lithium-ion batteries, the films being made of polymers such as polypropylene (PP), polyethylene (PE) and powdered UHMWPE (ultra high molecular weight PE) or HMWPE (high molecular weight PE) or HDPE (high density PE), and the polymer having to be homogeneously mixed, heated and plasticised with a liquid component, in particular a plasticiser (which is subsequently also referred to as a solvent and may contain e.g. paraffin oil, hydrocarbons, petroleum hydrocarbons, white mineral oil), to form the pores prior to stretching. The homogeneously incorporated plasticiser ensures that free spaces are formed in the polymer, which lead to pore formation during subsequent stretching and washing or evaporation of the plasticiser. The aim is to distribute the plasticiser in an extruder in such a homogeneous and fine manner in the polymer to be melted/melted polymer that as many and fine pores as possible are created during stretching and washing or evaporation of the plasticiser.

Normally, parallel-running twin-screw extruders are used for this purpose, to which the polymer is fed together with the liquid component, i.e. the plasticiser, in a previously homogeneously stirred suspension (slurry). The components are often fed individually to the twin-screw extruder also due to the simplified handling. When components are added individually to the extruder, homogeneous mixing places high demands on the mixing quality of the extruder. Homogeneous mixing results can be achieved primarily through long residence times, large mixing volumes and high speeds. Since the melt temperature quickly reaches the maximum permissible melt temperature applicable for explosion protection (depending on the self-ignition temperature of the liquid component) due to the frictional heat introduced during speed increases and heat can only be dissipated from the melt to a limited extent via the temperature-controlled cylinder shell, only limited speeds are possible. Especially when using UHMWPE with a high molecular weight above approx. 600,000 g/mol, the discharge is further reduced. If the liquid component, i.e. the plasticiser in particular, is flammable, the processing temperature window is shifted downwards again due to the explosion protection such that the maximum possible speed must be reduced once again, which leads to a reduction in discharge due to poorer homogenisation performance. In order to achieve discharges demanded by the industry, twin-screw extruders with relatively large screw diameters and long process lengths of 50-70 L/D (L/D=ratio of screw length to screw diameter) must be used.

Since the market requirements regarding the raw materials used as well as the discharge capacities are constantly increasing, but the machine costs must be kept low, it is the object of the invention to search for alternative extrusion concepts for the production of porous films or membrane films (e.g. battery separator films (BSF)).

The object is achieved by the installation for producing a polymer melt for a porous film, in particular a membrane film, according to claim 1. In addition, a use is described in claim 22. Claims 2 to 21 are advantageous developments of the installation according to the invention.

The installation according to the invention for producing a polymer melt for a porous film, in particular for a membrane film, comprises a planetary roller extruder. Said extruder is used to produce a flowable polymer melt from thermoplastics. The planetary roller extruder has a filling opening for introducing the starting materials and a discharge side for delivering the polymer melt. A melt pump is also provided. This is necessary as planetary roller extruders can only build up high melt pressures to a limited extent. However, since melt lines (pressure lines), melt filters and a wide-slot nozzle have to be passed through in direct film extrusion, a melt pressure of more than 40 bar, 50 bar, 60 bar, 70 bar or more than 80 bar is necessary. A melt pump is therefore connected directly after the planetary roller extruder to build up pressure. This connection is made in such a manner that the discharge side of the planetary roller extruder is connected to a downstream inlet side of the melt pump for further conveying the polymer melt. The connection is in the form of a shielded pressure channel or as a shielded pressure line with respect to the ambient atmosphere. The use of a shielded pressure channel allows the melt pump to be attached directly to the discharge side of the planetary roller extruder. The use of a shielded pressure line allows the planetary roller extruder to be installed at a distance from the melt pump. The planetary roller extruder and the melt pump are designed and/or can be driven in such a manner that the polymer melt is applied under pressure at the inlet side of the melt pump or can be transferred under pressure.

It is particularly advantageous that it has been found that planetary roller extruders provide particularly good results for the production of a porous film, in particular in the form of a membrane film. In the field of plastics, these have so far only been used for processing PVC. Compared to other extruders, the planetary roller extruder has a very large surface over which the polymer melt can be kneaded. The transfer of the polymer melt under pressure to the melt pump is also particularly advantageous, as undefined degassing or evaporation of a liquid component used, i.e. in particular the plasticiser for this porous film, can be prevented in this manner. At the same time, the high pressure ensures that the polymer melt is optimally mixed and air is simultaneously pressed out of it. The melt pump is also used to build up melt pressure (as explained below) and also to smooth melt pressure fluctuations. Overall, the use of a planetary roller extruder can achieve a particularly homogeneous polymer melt in a relatively compact installation. The use of such a planetary roller extruder also allows the liquid component, i.e. in particular the plasticiser, to be mixed homogeneously into the polymer and the liquid component, i.e. in particular the plasticiser, to be injected directly into or near the extruder. Furthermore, such a planetary roller extruder can have a modular design and allows gentle material preparation at high mixing performance. In addition, the melt temperature can be controlled up to the discharge. The pressure line is preferably shorter than 500 cm, 400 cm, 300 cm, 200 cm, 100 cm, 50 cm, 40 cm, 30 cm, 20 cm or shorter than 10 cm. The pressure line is preferably longer than 5 cm, 15 cm, 25 cm, 35 cm, 45 cm, 150 cm, 250 cm, 350 cm or longer than 450 cm.

It is particularly advantageous if the pressure under which the polymer melt is applied at the inlet side of the melt pump or can be transferred to the inlet side of the melt pump is greater than 4 bar, 5 bar, 6 bar, 7 bar, 8 bar, 9 bar, 10 bar, 11 bar, 13 bar, 15 bar, 17 bar or greater than 19 bar but preferably less than 21 bar, 18 bar, 16 bar, 14 bar or 12 bar. This ensures that the polymer melt is optimally mixed and that air contained in the bulk material (e.g. in the powdered polymer or between the powder particles) can be pressed out of the polymer melt. This pressure also prevents the liquid component from escaping and not being available or no longer available in sufficient concentration for later process stages. In principle, the bulk material could be added under a nitrogen atmosphere to keep the oxygen content low.

This would prevent oxidation of the polymer melt with the associated material degradation, but also a possible explosion of the liquid component.

In another example of the installation according to the invention, the pressure under which the polymer melt is applied at the inlet side of the melt pump or can be transferred thereto can be increased by the melt pump being designed to reduce the pump speed thereof. Such a reduced pump speed causes the polymer melt to back up from the inlet side of the melt pump towards the discharge side of the planetary roller extruder (and into said extruder), the continuous material flow of the further polymer melt counteracting this backflow (addition of the starting components (polymer and liquid component) is preferably not reduced) such that the pressure is increased. The melt pressure between the planetary roller extruder and the melt pump is therefore set in particular by the ratio between the addition of the starting components (dosing of the polymer and the liquid component) and the speed of the melt pump. The slower the melt pump rotates with constant addition of the starting components and in particular with a constant speed of the planetary roller extruder, the further the melt is backed up towards the planetary roller extruder. As already explained, this continuous melt stream in the planetary roller extruder counteracts the material backflow, which leads to pressure build-up. In principle, the pressure on the discharge side of the planetary roller extruder (at the extruder head) is successively increased until no more air is visible in the polymer melt. This is particularly successful at a melt pressure of more than 5 to 10 bar.

This air is preferably degassed only in reverse direction. This is achieved by ensuring that a region starting from the filling opening of the planetary roller extruder and extending to the inlet side of the melt pump is free of any air openings such that the air entrained in the polymer melt is displaced from the polymer melt when the pressure builds up and is pushed back towards the filling opening and degassed only from the filling opening. This is also referred to as reverse degassing. This also has the advantage that only this one location (in particular when flammable liquid components are used) must be specially secured.

Preferably, a ventilation device is installed in the area of the filling opening, which sucks gases or escaping air out of the filling opening and preferably feeds it to a filter arrangement.

A further particular embodiment of the installation also exists if the filling opening is in the form of a "common" filling opening, into which both a polymer, in particular a powdered polymer, and fillers, in particular in the form of liquid components, such as plasticisers, e.g. liquid hydrocarbons such as paraffin oil or liquid solvents, can be filled together. Due to the simultaneous addition of polymer and liquid component into the planetary roller extruder, good homogenisation at a moderate melt temperature is ensured. The addition should preferably occur under a nitrogen atmosphere. The liquid component can (additionally also) be added at other locations of the planetary roller extruder.

In a preferred embodiment of the installation, a drive apparatus is provided for driving the planetary roller extruder (e.g. electric motor). The planetary roller extruder comprises n-roller cylinders having n≥1, 2, 3, 4, 5, 6, 7 or n≥8. Such a roller cylinder comprises in particular an internally toothed outer shell (internally toothed cylinder sleeve), which has in particular a large outer diameter. Toothed planetary spindles are arranged therebetween. The toothed planetary spindles are driven by a centre spindle, which is also toothed. The centre spindle is arranged in the centre of the internally toothed cylinder sleeve. The planetary spindles are arranged between the cylinder sleeve and the centre spindle. Good results are achieved with at least 3 and, depending on the installation type, with up to 18 planetary spindles per roller cylinder. The centre spindle and the planetary spindles mesh, and the planetary spindles mesh with the internally toothed cylinder sleeve.

Via the driven centre spindle, the planetary spindles rotate between the internally toothed cylinder sleeve and the centre spindle in a planetary manner, thereby rolling out the polymer melt into thin layers. The resulting large surface area of the rolled-out polymer, i.e. the rolled-out polymer melt, allows both controlled energy input and controlled energy dissipation. The centre spindle penetrates a plurality of roller cylinders, in particular all roller cylinders. In particular, the centre spindle is constructed in one piece, but could also consist of a plurality of parts which are connected to one another (e.g. screwed together, inserted one into the other and/or welded) for conjoint rotation. The first roller cylinder preferably comprises the filling opening and the last roller cylinder preferably comprises the discharge side.

Preferably, the planetary roller extruder comprises four or more than four, six, or eight or more than eight roller cylinders. The individual roller cylinders are preferably screwed together, as a result of which a modular design of the planetary roller extruder is achieved.

The more roller cylinders are provided, the higher the specific discharge with a homogeneous melt. A particularly good result is achieved with six to eight or more than eight roller cylinders, since a higher number of roller cylinders results in a longer planetary roller extruder, which also extends the residence and mixing time. In this case the polymer melt is very homogeneous. At the same time, a temperature profile can be set individually via the individual roller cylinders (e.g. warmer at the filling opening and cooler on the discharge side). This will be explained in more detail below.

The inner toothing of the cylinder sleeve, the toothing of the centre spindle and the toothing of the planetary spindles is preferably a 45° helical toothing (=spiral toothing). This creates a forward flow of the rolled-out polymer melt.

The planetary spindles can also be studded, which means that the 45° helical toothing is occasionally interrupted along the longitudinal axis or at regular intervals along the longitudinal axis of the planetary spindles. The same preferably also applies to the centre spindle, which is also interrupted in particular at the transition from one roller cylinder to the next roller cylinder. Such an interrupted helical toothing (spiral toothing) results in a very good cross mixing due to many individual melt stream distributions.

The length of each planetary spindle preferably corresponds approximately to the length of a roller cylinder. In particular, the planetary spindles within most roller cylinders are arranged entirely within the particular roller cylinder and do not extend beyond this roller cylinder into adjacent roller cylinders. Nevertheless, it can apply in particular to the first two adjacent roller cylinders that these also comprise continuous planetary spindles. Such planetary spindles are longer than the particular roller cylinder. They therefore extend in both the first and the second roller cylinder, and are therefore arranged together in both roller cylinders.

In this case a toothed intermediate ring, which has the shape of the internal toothing of the cylinder sleeve, is preferably inserted between the first two adjacent roller cylinders. Said ring acts as a connecting piece between two roller cylinders, making it particularly easy to use continuous planetary spindles.

In a further preferred embodiment, a dispersion ring is inserted between two adjacent roller cylinders. This applies in particular from the second to the nth roller cylinder (the toothed intermediate ring is preferably inserted between the first and the second roller cylinder). The dispersion rings preferably differ from one another with respect to the dimension of their annular gap. A dispersion ring having a larger annular gap than in the other dispersion rings arranged towards the discharge side is inserted between the second and the third roller cylinder. The dispersion ring between the second and the third roller cylinder preferably comprises an annular gap which is larger than 1 mm, 1.2 mm, 1.4 mm, 1.7 mm or 1.9 mm and which is preferably smaller than 2.1 mm, 1.8 mm or 1.6 mm. The subsequent dispersion rings preferably have an annular gap which is larger than 0.7 mm, 0.8 mm, 0.9 mm, 1 mm, 1.1 mm or 1.2 mm and preferably smaller than 1.3 mm or 1.1 mm. The dispersion ring between the second and the third roller cylinder therefore has a larger annular gap, since additional inhomogeneities can occur here which could lead to blocking of the transition between two roller cylinders if the annular gap is too small. In the further course of the planetary roller extruder, the polymer melt is largely homogeneous, which reduces the risk of blocking and allows smaller annular gaps to be used.

In a particular embodiment of the installation according to the invention, a dosing arrangement is also provided. This dosing arrangement comprises at least one (e.g. gravimetric) dosing unit for at least one polymer and a dosing pump, as well as at least one injection arrangement for the liquid component. The dosing arrangement is designed to discharge the dosed polymer and the dosed liquid component directly through the filling opening into the first roller cylinder, where the polymer and the liquid component are mixed together. Alternatively, the dosing arrangement is designed to feed the dosed polymer and the dosed liquid component into a side feeder having one or two screw-conveyors, in which mixing of the polymer and the liquid component occurs, the screw conveyor(s) then discharging the mixture through the filling opening into the first roller cylinder. For example, a membrane pump or a toothed wheel pump can be used as the dosing pump.

The simultaneous addition of polymer and liquid component ensures very good homogenisation at a moderate melt temperature. The polymer is present in particular as a powder. Such dosing of the powdered polymer together with the liquid component, in particular in the form of the plasticiser, into a common side feeder has likewise not previously been achieved.

In a further embodiment, the dosing arrangement also comprises one or more further injection arrangements. These one or more further injection arrangements are arranged along the planetary roller extruder. In particular, they are each arranged at the transition region between one roller cylinder and the adjacent roller cylinder thereof. Via this or these further injection arrangement(s), an additional precisely dosed amount of the same or a further liquid component can be injected into the planetary roller extruder or into this transition region of the planetary roller extruder.

Preferably, the dosing arrangement is designed to set the ratio of the amount of polymer and liquid component fed to the planetary roller extruder (3) in such a manner that:
  a) 80 to 50 parts by weight of the liquid component can be added to 20 to 50 parts by weight of the polymer; or
  b) 75 to 55 parts by weight of the liquid component can be added to 25 to 45 parts by weight of the polymer; or
  c) 70 to 60 parts by weight of the liquid component can be added to 30 to 40 parts by weight of the polymer.

In a further preferred embodiment, the installation also comprises at least one pressure sensor, which is arranged on the nth roller cylinder or between the nth roller cylinder and the inlet side of the melt pump and is used to measure a pressure of the polymer melt. Furthermore, a control device is provided which receives and evaluates this measured value and is therefore designed to control the dosing arrangement with respect to the output amount thereof, the drive apparatus with respect to the speed of the centre spindle and the melt pump with respect to the pump speed in such a manner that the measured pressure by the at least one pressure sensor reaches a predetermined reference value. If the pressure is too low, the speed of the melt pump can be slowed down, for example. Alternatively or additionally, more material can be added by the dosing arrangement. If the pressure is too high, the speed of the melt pump can be increased, or less starting material can be added by the dosing arrangement of the filling opening. As explained, air inclusions in the polymer melt should be avoided. For this purpose, the melt pressure on the discharge side of the planetary roller extruder and on the inlet side of the melt pump must preferably be at least 5-10 bar. Additionally, the speed of the planetary roller extruder can be reduced while maintaining the same discharge in order to achieve a higher specific discharge [kg/h/rpm] and therefore a higher filling level in the process section. A higher filling level in the planetary roller extruder increases the melt pressure in the planetary roller extruder, which contributes to an early reverse degassing of the air.

The use of the planetary roller extruder results in a large surface area of the rolled-out polymer melt. This allows the controlled energy input or controlled energy dissipation via thermal heating/cooling. In a particular embodiment of the installation according to the invention, the centre spindle is penetrated completely or along the predominant length thereof by at least one fluid channel (preferably two (parallel) fluid channels are provided, through which the fluid flows in opposite directions, i.e. one forward and one return channel). Furthermore, a pump arrangement and a heating and/or cooling arrangement are provided, which are designed to control the temperature of the fluid (e.g. (thermal) oil or water) to a certain temperature and to conduct said fluid through the at least one fluid channel in order to thereby control the temperature of the polymer melt to a certain temperature via the centre spindle.

In addition to the centre spindle, the temperature of the roller cylinders can also be controlled (in particular individually). The roller cylinders each comprise at least one temperature-control channel. A pump arrangement and a temperature-control arrangement are provided and are designed to control the temperature of a fluid (e.g. (thermal) oil or water) to a specific temperature and to conduct said fluid through the at least one temperature-control channel of the particular roller cylinder in order to thereby control the temperature of the polymer melt to a specific temperature via the roller cylinders. The at least one temperature-control channel of each roller cylinder is separated from the temperature-control channels of the respective other roller cylinders, as a result of which the temperature-control channels of the individual roller cylinders can be temperature-controlled differently, it being possible for the temperature of a fluid in the first roller cylinder to be warmer than the temperature of a fluid in the nth roller cylinder. The term "temperature control" is understood here to mean that the polymer melt is both heated and cooled (the fluid is cooler than the polymer melt).

In a further optional embodiment, the melt pump can also be temperature-controlled (heated or cooled) electrically or with thermal oil. The temperature is in principle detected by temperature sensors and transmitted to the control device. The control device preferably detects all process parameters (temperature, pressure) at various locations in the installation and generates corresponding manipulated variables which are transmitted to the drive device for the centre spindle or to the drive device for the melt pump or to the dosing arrangement. If a maximum permissible melt temperature is exceeded, a switch-off (explosion protection) is preferably triggered. In contrast, the measured pressure is used to control the speed of the planetary roller extruder and the discharge of the melt pump in a closed-loop manner.

Furthermore, a use is also specified. Thus the installation can be used to produce a polymer melt for a porous film, in particular a membrane film, in this case a polymer and simultaneously a liquid component, in particular a plasticiser, being fed to the filling opening. As already explained, planetary roller extruders have not been used in the past to produce a porous film.

Various embodiments of the invention are described below by way of example with reference to the drawings. The same items have the same reference numerals. The corresponding figures in the drawings show in detail:

Figure 1:
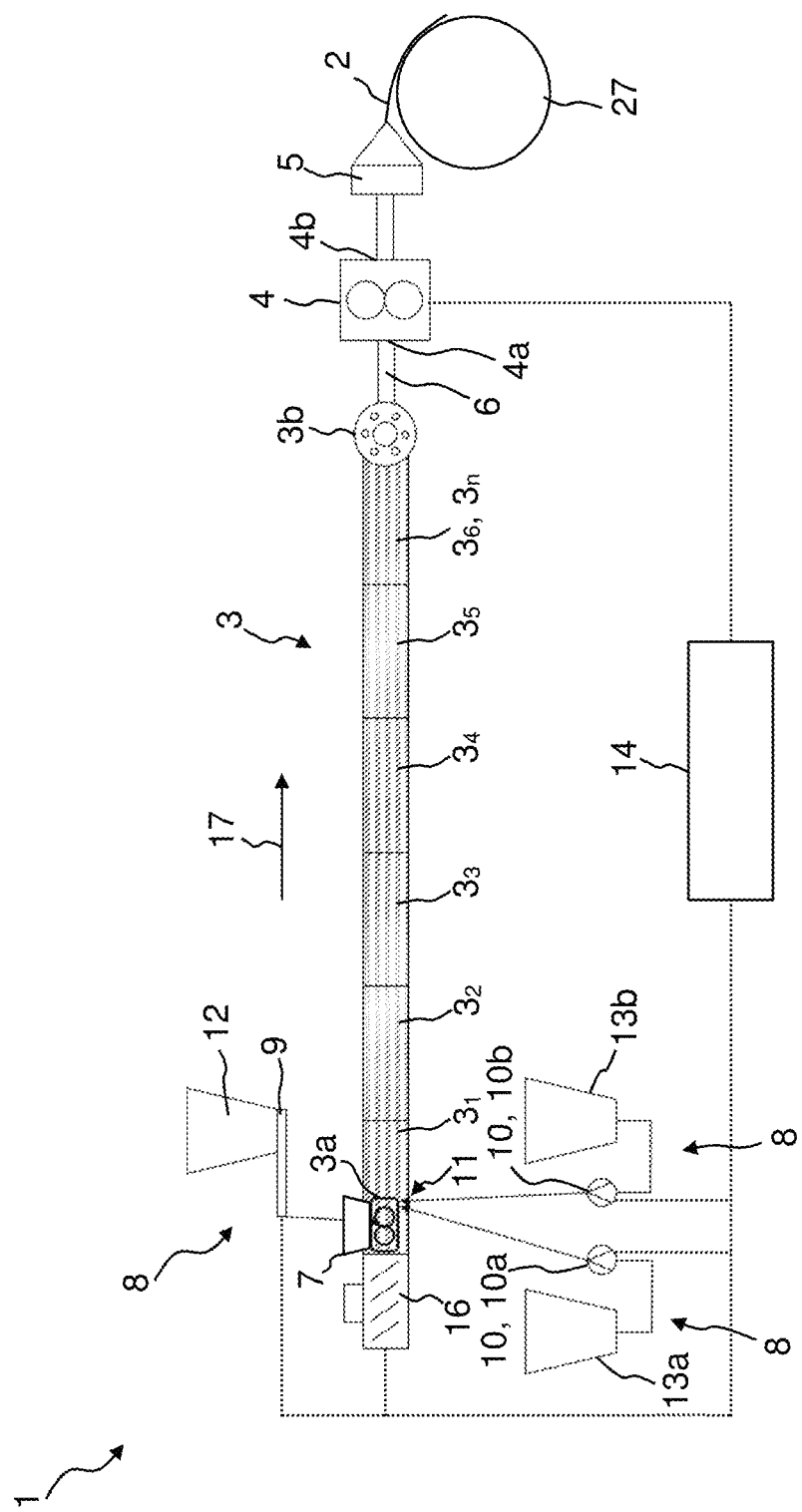
FIG. 1 is an overall view of a first embodiment of an installation for producing a polymer melt for a porous film, in particular a membrane film.

FIG. 1 shows an installation 1 for producing a polymer melt 2 for a porous film, or a membrane film. Said installation comprises a planetary roller extruder 3, which has a filling opening 3a and a discharge side 3b. The filling opening 3a is in particular a lateral filling opening 3a. A melt pump 4 and a wide-slot nozzle 5 are also provided. The discharge side 3b of the planetary roller extruder 3 is connected to a downstream inlet side 4a of the melt pump 4 for further conveying the polymer melt 2. In this case the connection is in the form of a pressure line 6 shielded from the ambient atmosphere. The planetary roller extruder 3 and the melt pump 4 are designed and/or can be driven in such a manner that the polymer melt 2 is applied under pressure at the inlet side 4a of the melt pump 4 or can be transferred to the inlet side 4a under pressure. The wide-slot nozzle 5 is connected to an outlet side 4b of the melt pump 4. It is not shown that between the outlet side 4b of the melt pump 4 and the wide-slot nozzle 5 a flush valve and/or a melt filter can optionally be arranged. The melt pump 4 and/or the pressure line 6 and/or the flush valve and/or the melt filter can be electrically temperature-controlled, in particular can be electrically heated such that the polymer melt 2 is always within the processing temperature window and therefore has the corresponding viscosity, among other things. The temperature could also be controlled by thermal oil. In particular, the viscosity of the polymer melt 2 leaving the wide-slot nozzle 5 is in the range of 1000 to 4000 Pa*s. The wide-slot nozzle 5 has in particular a slot width of more than 300 mm, 400 mm, 500 mm, 600 mm, 700 mm, 800 mm, 1000 mm, 1200 mm, 1400 mm, 1600 mm, 1800 mm, 2000 mm, 2200 mm, 2400 mm, 2600 mm, 2800 mm or more than 3000 mm but preferably less than 3100 mm, 2900 mm, 2700 mm, 2500 mm, 2300 mm, 2100 mm, 1900 mm, 1700 mm, 1500 mm, 1300 mm, 1100 mm, 900 mm, or less than 650 mm. The wide-slot nozzle 5 has a slot height of more than 0.1 mm, 0.3 mm, 0.5 mm, 0.7 mm, 0.9 mm, 1.1 mm, 1.3 mm, 1.5 mm, 1.7 mm, 1.9 mm, 2.1 mm, 2.3 mm, 2.5 mm, 2.7 mm, 2.9 mm or more than 3.1 mm, but preferably less than 3.2 mm, 3.0 mm, 2.8 mm, 2.6 mm, 2.4 mm, 2.2 mm, 2.1 mm, 2.0 mm, 1.8 mm, 1.6 mm, 1.4 mm, 1.2 mm, 1.0 mm, 0.8 mm, 0.6 mm, 0.4 mm or less than 0.2 mm.

The polymer melt 2 is discharged from the wide-slot nozzle 5 onto a cooling roller 27, the temperature of which is controlled (in a closed-loop manner) to a certain temperature, and optionally partially arranged in a water bath (not shown). A motor device (not shown) is designed to rotate the cooling roller 27.

The pressure under which the polymer melt 2 is applied at the inlet side 4a of the melt pump 4 or can be transferred thereto is preferably greater than 5 to 10 bar.

The pressure can be increased by reducing the pump speed of the melt pump 4. If the material flow through the planetary roller extruder 3 remains constant, the reduction of the pump speed causes the polymer melt 2 to back up from the inlet side 4a of the melt pump 4 towards the discharge side 3b of the planetary roller extruder 3. This backflow is counteracted by the ongoing continuous material flow of the further polymer melt 2 such that an increase in pressure occurs in the region of the discharge side 3b of the planetary roller extruder 3. The backflow of the polymer melt 2 preferably extends to less than 50%, 40%, 30%, 20% or less than 10% of the length of the planetary roller extruder 3.

Alternatively or additionally, it would also be possible here to add additional starting material to the filling opening 3a.

It is particularly important that the region starting from the filling opening 3a of the planetary roller extruder 3 to the inlet side 4a of the melt pump 4 is free of air openings. This is achieved, as already explained, by the shielded pressure line 6 or generally by a shielded pressure channel (not shown). This has the effect that the air entrained in the polymer melt 2 is displaced from the polymer melt during the pressure build-up (preferably more than 5-10 bar) of the polymer melt 2 and, in the absence of other openings, is forced back towards the filling opening 3a and degassed only from this filling opening. These missing air openings also mean that components or fillers within the polymer melt 2, such as the liquid component, in particular the plasticiser, remain in the polymer melt 2 and are available for subsequent processes. With these fillers there is no uncontrolled degassing, which would be particularly critical if they were highly flammable.

It is also particularly advantageous that the filling opening 3a in FIG. 1 is in the form of a common filling opening 3a for a polymer, in particular for a powdered polymer, and for fillers, in particular in the form of liquid components such as liquid hydrocarbons or plasticisers. The liquid component can also be a solvent.

Figure 2:
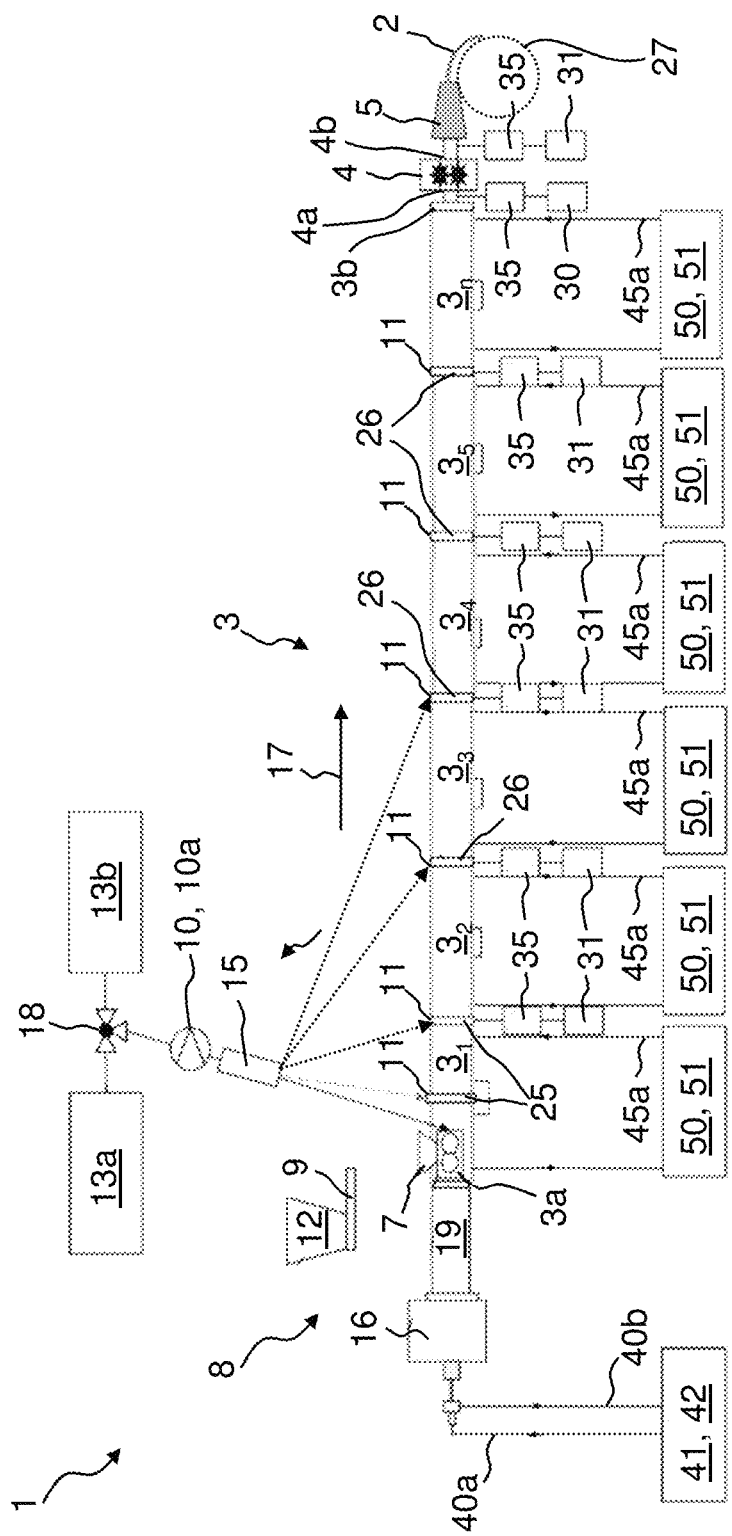
FIG. 2 is an overall view of a second detailed embodiment of an installation for producing a polymer melt for a porous film, or a membrane film.

After extensive investigations, particularly advantageous results have been obtained when the polymer and the liquid component are fed together in the planetary roller extruder 3 or into a corresponding side feeder 7 (see FIG. 2). This is achieved by a dosing arrangement 8. This comprises in particular at least one gravimetric dosing unit 9 for at least one (e.g. powdered) polymer, optionally processing aids such as antioxidants, and a dosing pump arrangement 10 having at least one dosing pump 10a, 10b and at least one injection arrangement 11. The at least one dosing unit 9 should be arranged as close as possible to the filling opening 3a or the side feeder 7 (the distance should be smaller than 100 cm, 80 cm, 60 cm, 40 cm, 30 cm, 20 cm or 10 cm), as this keeps the static charge of the powdered polymer low.

The dosing arrangement 8 is designed to dose the polymer and the liquid component and either to discharge them directly through the filling opening 3a into the planetary roller extruder 3, where the polymer and the liquid component are mixed together (shown in FIG. 1) or to feed them into a side feeder 7, which in turn has one or two screw conveyors(s), in which mixing of the polymer and the liquid component is performed, the screw conveyor(s) then discharging this mixture via the filling opening 3a into the planetary roller extruder 3. Homogeneous mixing does not yet take place at this point. The polymer is wetted with the liquid component in the screw conveyor or the screw conveyors of the side feeder 7. The polymer wetted with the liquid component is fed to the planetary roller extruder 3. In the planetary roller extruder 3, the portions of the liquid component are mixed together, the polymer portions are melted and the melt is homogenised.

The at least one gravimetric dosing unit 9 is connected to a polymer reservoir 12, which is filled with preferably powdered polymer.

In addition to the at least one first dosing pump 10a of the dosing pump arrangement, FIG. 1 also shows a further dosing pump 10b, which can also be a part of the dosing pump arrangement 10. A first reservoir 13a and a second reservoir 13b for a first and a second liquid component are also shown. The first dosing pump 10a is connected to the first reservoir 13a. The second dosing pump 10b is in turn connected to the second reservoir 13b. A control device 14 controls the dosing arrangement 8 and thus determines the mixing ratio between the polymer and liquid component. The dosing pump 10a, 10b is preferably a piston membrane pump or a toothed wheel pump. A flow meter 15 (see FIG. 2), in particular in the form of a Coriolis flow meter 15, can optionally be connected upstream or downstream of the particular dosing pump 10a, 10b. This in turn would be connected to the control device 14.

To improve the dosing accuracy of the liquid component, pulsation dampers (bubble accumulators) are preferably inserted between the dosing pump 10a, 10b and the flow meter 15, which dampers dampen or smooth pulsations starting from the dosing pump 10a, 10b.

It is also possible to preheat the liquid component to a desired temperature (50-100° C.) in the reservoir 13a, 13b and/or between the pump station and the injection location. Preferably, the liquid component, in particular the plasticiser, is conducted through a heat exchanger downstream of the dosing pump 10a, 10b, where it is preheated to the desired temperature by means of thermal oil. The line between the heat exchanger and the injection nozzle is equipped with an auxiliary heater to keep the preheated liquid component at the right temperature. Temperature sensors (not shown) can measure the temperature, allowing the heat output to be controlled in a closed-loop manner.

The dosing arrangement 8 is designed to set the ratio of the amount of polymer and liquid component fed to the planetary roller extruder 3, it being possible to add 80-50 parts by weight of the liquid component to 20-50 parts by weight of the polymer. Preferably 75-55 parts by weight of the liquid component can be added to 25-45 parts by weight of the polymer and even more preferably 70-60 parts by weight of the liquid component can be added to 30-40 parts by weight of the polymer.

In particular, battery separator films can be produced in this manner, since gentle material preparation, good homogenisation and dispersion and melt temperature control is possible due to large polymer surface areas and temperature control of the centre spindle 20. For battery separator films (UHMWPE/HMWPE), the polyethylene (PE) proportion is 30% to 40% and the liquid component proportion is 60% to 70%.

The proportion of the liquid component can be injected through one injection location or through a plurality of injection locations (distributed over the process length).

FIG. 1 also shows a drive apparatus 16, which is used to drive the planetary roller extruder 3. Said drive apparatus is preferably an electric motor.

The planetary roller extruder 3 comprises n-roller cylinders $3_1$ to $3_n$, where $n \geq 1$ $n \geq 2$, $n \geq 3$, $n \geq 4$, $n \geq 5$, $n \geq 6$, $n \geq 7$, $n \geq 8$, $n \geq 9$ or $n \geq 10$. FIG. 1 shows six roller cylinders $3_1$ to $3_6$.

These n-roller cylinders $3_1, \ldots, 3_n$ are arranged adjacent to one another along their longitudinal axis 17 and are fastened to one another, in particular screwed together. The roller cylinders $3_1, \ldots, 3_n$ should be additionally sealed such that the installation 1 can be regarded as permanently technically tight. This can be done by metal sealing or by means of seals that comprise or consist of, for example, PTFE, Viton® (consisting of or comprising fluorinated rubber or fluorocarbon rubber), aluminium, graphite, graphite foil, etc. The planetary roller extruder 3 is therefore of modular design. Said extruder can comprise any number of roller cylinders $3_1, \ldots, 3_n$. In particular, the number of roller cylinders $3_1, \ldots, 3_n$ can be adjusted according to the polymer melt 2 to be produced.

Figure 3:
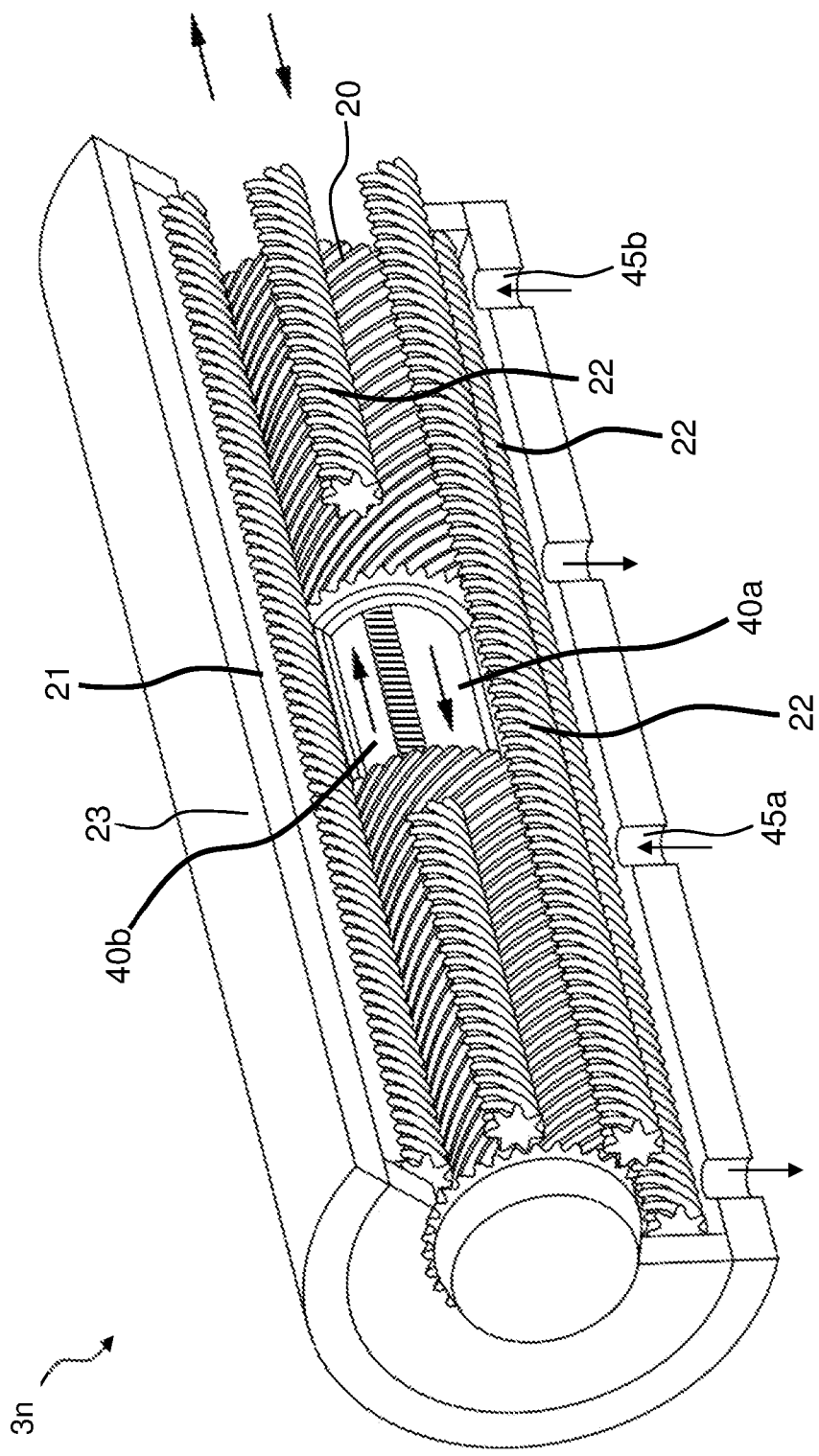
FIG. 3 is a three-dimensional view of a partially opened roller cylinder of a planetary roller extruder.
Figure 4:
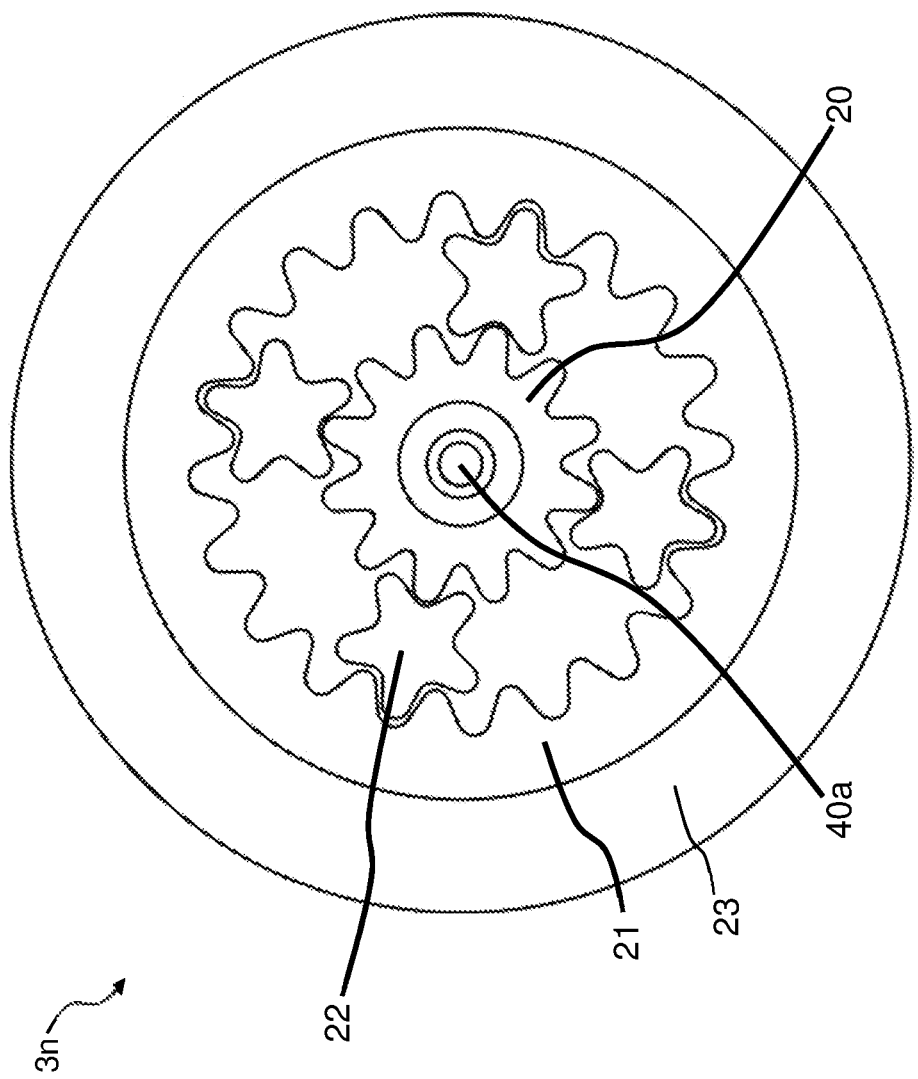
FIG. 4 is a three-dimensional view of a cross section through a roller cylinder of a planetary roller extruder.

The exact design of the planetary roller extruder 3 can be seen in FIGS. 2, 3 and 4. As shown in FIG. 1, the embodiment of the planetary roller extruder 3 in FIG. 2 also comprises six roller cylinders $3_1, \ldots, 3_6$, which are arranged in relation to one another along their longitudinal axis 17 and screwed together and/or connected with clamps. As explained, the starting components are added into the filling opening 3a via a side feeder 7. In this case, the dosing arrangement 8 or the dosing pump arrangement 10 comprises only a first dosing pump 10a. A plurality of dosing pumps 10a could of course also be used. In this case this first dosing pump 10a is not directly connected to the first reservoir 13a of the liquid component. Instead, there are in turn a first and a second reservoir 13a, 13b, the first dosing pump 10a being connected or connectable either to the first reservoir 13a or to the second reservoir 13b via a ball valve 18. The position of the ball valve 18 can be selected either manually by hand or automatically via a setting device not shown. The setting device could be controlled via the control apparatus 14. Of course just one reservoir 13a could also be used. In this case the ball valve 18 can be omitted. The number of reservoirs 13a, 13b is unlimited and a plurality of reservoirs 13a, 13b allow a faster change of the liquid component during operation.

A drive apparatus 16 in turn drives the planetary roller extruder 3. Between the drive apparatus 16 and the first roller cylinder $3_1$, which has the filling opening 3a, an additional cylinder 19 is also provided. This could be used in the production of other films. The additional cylinder 19 comprises only one screw conveyor, which is also aligned in the longitudinal direction 17 of the planetary roller extruder 3. This additional cylinder 19 is not required for the installation 1 according to the invention, but illustrates the modular design of the installation in general and of the planetary roller extruder 3 in particular. This additional cylinder 19 is sealed in particular by means of a Viton® shaft seal (not shown) (consists of or includes fluorine rubber or fluorocarbon rubber) in such a manner that no polymer melt 2 or starting components (polymer or liquid component) can escape into said seal.

FIG. 3 shows an example of a roller cylinder $3_3$. It should be noted that the entire planetary roller extruder 3 is penetrated by a centre spindle 20. This runs through all roller cylinders $3_1, \ldots, 3_n$ and is preferably formed in one piece. This centre spindle 20 is toothed. Furthermore, each roller cylinder $3_1, \ldots, 3_n$ comprises an internally toothed cylinder sleeve 21 (the internal toothing is not shown in the drawings) and m toothed planetary spindles 22, where m>3, m>5, m>7, m>9, m>11, m>13 up to m>20. The centre spindle 20 and the m planetary spindles 22 are arranged inside the cylinder sleeve 21 of the particular roller cylinder $3_1, \ldots, 3_n$. The planetary spindles 22 are arranged between the centre spindle 20 (in the centre) and the cylinder sleeve 21. Preferably only the centre spindle 20 can be driven by the drive apparatus 16, the m planetary spindles 22 roll on the centre spindle 20 and the cylinder sleeve 21 by turning the centre spindle 20.

It is also shown that the toothing of the cylinder sleeve 21, the centre spindle 20 and the planetary spindles 22 is a 45° helical toothing (spiral toothing), as a result of which a forward flow of polymer melt 2 is produced and said melt is simultaneously rolled out.

The cylinder sleeve 21 can still be fixed and surrounded by an outer sleeve 23.

With respect to FIG. 2, the planetary spindles 22 within most of the roller cylinders $3_1, \ldots, 3_n$ are arranged exclusively within the particular roller cylinder $3_1, \ldots, 3_n$ and do not extend therefrom into adjacent roller cylinders $3_1, \ldots, 3_n$. An exception can be made for the first two adjacent roller cylinders $3_1, 3_2$. Said cylinders preferably comprise continuous planetary spindles 22, which are arranged in both the first and the second roller cylinders $3_1, 3_2$. A toothed intermediate ring 25 is preferably inserted between the first two adjacent roller cylinders $3_1, 3_2$ to ensure that said planetary spindles can roll well. The toothed intermediate ring 25 has the shape of the internal toothing of the cylinder sleeve 21. FIG. 2 also shows that an additional toothed intermediate ring 25 is inserted inside a roller cylinder $3_1, \ldots, 3_n$, in particular inside the first roller cylinder $3_1$. This is preferably inserted in the middle of the first roller cylinder $3_1$.

At least from the second roller cylinder $3_2$ up to preferably the nth roller cylinder $3_n$, a dispersion ring 26 is arranged between each two adjacent roller cylinders $3_2, \ldots, 3_n$. The dispersion ring 26 on the second roller cylinder $3_2$ (at the transition to the third roller cylinder $3_3$) preferably has a larger annular gap than the dispersion ring 26 between the n-1th roller cylinder $3_{n-1}$ and the nth roller cylinder $3_n$. Preferably only the first dispersion ring 26, i.e., the one closest to the filling opening 3a, is equipped with a larger annular gap. The annular gaps of all other dispersion rings 26 are preferably the same size.

The toothing of the centre spindle 20 is interrupted at the transition from one roller cylinder $3_1, \ldots, 3_{n-1}$ to an adjacent roller cylinder $3_2, \ldots, 3_n$. The same can also apply to the toothing of the planetary spindles 22. In principle, these can also be interrupted at (regular) intervals, which increases the cross mixing.

In this example, the dosing arrangement 8 also comprises one or more further injection arrangements 11, these one or more further injection arrangements 11 each being arranged along the planetary roller extruder 3, in particular at the transition region from one roller cylinder $3_1, \ldots, 3_n$ to another adjacent roller cylinder $3_1, \ldots, 3_n$, and are designed to inject an additional, precisely dosed amount of the liquid component into the planetary roller extruder 3. These further injection arrangements 11 could also be installed in the particular roller cylinder $3_1, \ldots, 3_n$. The same liquid components or different liquid components can be injected in each case.

The amount can also vary from injection arrangement 11 to injection arrangement 11 along the planetary roller extruder 3.

FIG. 2 also shows the use of different pressure sensors 30, 31. Preferably a pressure sensor 30 is arranged on the nth roller cylinder $3_n$ or between the nth roller cylinder $3_n$ and the inlet side 4a of the melt pump 4 and is designed to measure a pressure in the polymer melt 2. In that case, the control device 14 is designed to control, at a measured pressure value which is below a reference value, the dosing arrangement 8 with respect to the output amount thereof in such a manner that said arrangement increases the output amount thereof. Additionally or alternatively, the control device 14 is designed to control the drive apparatus 16 with respect to the speed of the centre spindle 20 in such a manner that said spindle increases the speed thereof. Additionally or alternatively, the control device 14 is designed to control the melt pump 4 with respect to the pump speed in such a manner that said pump reduces the speed thereof. This ensures that the pressure measured by the at least one pressure sensor 30 approximately reaches the predetermined reference value (deviation preferably <10%).

Additionally or alternatively, the control device 14 is also designed such that, at a measured pressure value which lies above a reference value, the dosing arrangement 8 is controlled with respect to the output amount thereof in such a manner that said arrangement reduces the output amount thereof. Additionally or alternatively, the control device 14 is designed to control the drive apparatus 16 with respect to the speed of the centre spindle 20 in such a manner that said spindle reduces the speed thereof. Additionally or alternatively, the control device 14 is designed to control the melt pump 4 with respect to the pump speed in such a manner that said pump increases the speed thereof. This ensures that the pressure measured by the at least one pressure sensor 30 approximately reaches the predetermined reference value (deviation preferably <10%).

As shown in FIG. 2, there may be a plurality of other pressure sensors 31, which are located on other roller cylinders $3_1, \ldots, 3_{n-1}$ or between the other roller cylinders $3_1, \ldots, 3_{n-1}$ and are designed to measure a pressure inside the planetary roller extruder 3. In the event of pressure fluctuations of at least one measured pressure value from the at least one pressure sensor 30 or from the plurality of further pressure sensors 31, which fluctuations lie above a threshold value, the control device 14 is designed to control the drive apparatus 16 with respect to the speed of the centre spindle 20 in such a manner that said spindle reduces the speed thereof and/or controls the melt pump 4 with respect to the pump speed in such a manner that said pump increases the speed thereof. High pressure fluctuations often indicate inadequate homogenisation due to insufficient residence time of the polymer melt 2 within the planetary roller extruder 3. Additionally, if the filling level is too low, pressure surges can occur through partially filled regions and surge-like discharges can occur at backflow regions such as the dispersion rings 26.

The main influence on the residence time of the polymer melt 2 in the planetary roller extruder 3 is not only the backflow of the polymer melt 2 due to the upstream pump pressure but also the speed of the planetary roller extruder 3 at a certain discharge. The faster the centre spindle 20 rotates at the same discharge, the lower the specific discharge and therefore the residence time. This is accompanied by an increase in shear and therefore the melt temperature.

The lower the speed of the planetary roller extruder 3 at constant discharge, the higher the specific discharge and therefore the residence time. This is accompanied by a reduction in shear and therefore the melt temperature.

The optimum operating point can be set depending on the composition and permissible melt temperature.

It is important to achieve good homogenisation at a low melt temperature and low pressure fluctuations. High pressure fluctuations generally indicate inhomogeneities in the polymer melt 2. Pressure fluctuations can also occur if the specific discharge of the planetary roller extruder 3 is too low or too high. If the specific discharge is too low, pressure surges can occur in partially filled regions due to surge-like discharge at backflow regions such as dispersion rings. If the specific discharge is too high, the shear introduced into the polymer melt 2 is not sufficient to generate a homogeneous polymer melt 2.

With respect to FIGS. 2, 3 and 4, it can be seen that the centre spindle 20 is completely penetrated along the length thereof by at least one fluid channel 40a. FIG. 4 shows a fluid channel 40a, whereas FIGS. 2 and 3 show two fluid channels 40a and 40b. In FIG. 3, one fluid channel 40a is used as a run-in channel and the other fluid channel 40b as return channel. Furthermore, a pump arrangement 41 and a heating and/or cooling arrangement 42 are provided (see FIG. 2), which are designed to control the temperature of a fluid, in particular in the form of thermal oil or water, to a certain temperature and to conduct said fluid through the at least one fluid channel 40a. This allows the temperature of the polymer melt 2 to be controlled to a specific temperature. The centre spindle 20 comprises corresponding connections or inlets/outlets for the fluid channel 40a or the fluid channels 40a, 40b, which are arranged at the same or different ends of the centre spindle 20.

This is similar for the roller cylinders $3_1, \ldots, 3_n$. Each roller cylinder $3_1, \ldots, 3_n$ comprises at least one temperature-control channel 45a (see FIG. 2). A pump arrangement 50 and a temperature-control arrangement 51 are provided and are designed to control the temperature of a fluid to a certain temperature and to conduct said fluid through the at least one temperature-control channel 45a of the particular roller cylinder $3_1, \ldots, 3_n$ in order to thereby control the temperature of the polymer melt 2 within this roller cylinder $3_1, \ldots, 3_n$ to a certain temperature. Each of the at least one temperature-control channels 45a of the roller cylinders $3_1, \ldots, 3_n$ are separated from one another (the same fluid does not flow therethrough) and can therefore be temperature-controlled differently, the temperature of a fluid in the first roller cylinder $3_1$ ideally being higher than the temperature of a fluid in the nth roller cylinder $3_n$. However, this does not have to be the case.

In FIG. 3 the temperature-control channels 45a are given only by way of example. These of course do not constitute an opening from which the polymer melt 2 can escape.

Preferably, the temperature of the fluid conducted through the centre spindle 20 is set precisely to 170° C. (deviation ≤±10° C. or ≤±5° C.). Generally, however, the temperature should be higher than 130° C., 140° C., 150° C., 160° C., 170° C., 180° C., 190° C. or higher than 200° C., but preferably lower than 205° C., 195° C., 185° C., 175° C., 165° C., 155° C., 145° C. or lower than 135° C.

In the first roller cylinder $3_1$ the temperature is also preferably set to 170° C. (deviation ≤±10° C., ≤±5° C.) Generally, however, the temperature should be higher than 80° C., 90° C., 100° C., 110° C., 120° C., 130° C., 140° C., 150° C., 160° C., 170° C., 180° C., 190° C. or higher than 200° C., but preferably lower than 205° C., 195° C., 185° C., 175° C., 165° C., 155° C., 145° C., 135° C., 125° C., 115° C., 105° C., 95° C. or lower than 85° C.

In the second and the third roller cylinder $3_2$, $3_3$ the temperature is preferably set precisely to 160° C. (deviation ≤±10° C. or ≤±5° C.). Generally, however, the temperature should be higher than 100° C., 110° C., 120° C., 130° C., 140° C., 150° C., 160° C. or higher than 170° C., but preferably lower than 175° C., 165° C., 155° C., 145° C., 135° C., 125° C., 115° CC or lower than 105° C.

In the fourth to the sixth and preferably up to the nth roller cylinder $3_4, \ldots, 3_n$, the temperature is preferably set to 130° C. (deviation: ≤±10° C. or ≤±5° C.). Generally, however, the temperature should be higher than 100° C., 110° C., 120° C., 130° C., 140° C., 150° C., 160° C. or higher than 170° C., but preferably lower than 175° C., 165° C., 155° C., 145° C., 135° C., 125° C., 115° CC. or lower than 105° C.

By these temperature settings, homogeneity, pressure fluctuations and nozzle strips can be optimally maintained. The possibility of individually controlling the temperature of the centre spindle 20 as well as of the roller cylinders $3_1, \ldots, 3_n$ can have a positive influence on the melt temperature and homogeneity, among other things.

FIG. 3 shows that one, a plurality or all of the roller cylinders $3_1, \ldots, 3_n$ comprise at least one further temperature-control channel 45b. The at least one temperature-control channel 45a and the at least one further temperature-control channel 45b are arranged inside the particular roller cylinder $3_1, \ldots, 3_n$ so as to be offset from one another in the longitudinal direction and/or in the circumferential direction of the particular roller cylinder $3_1, \ldots, 3_n$. The pump arrangement 50 and the temperature-control arrangement 51 are further designed to control the temperature of a fluid to a certain temperature and to conduct said fluid through the at least one further temperature-control channel 45b of the particular roller cylinder $3_1, \ldots, 3_n$ in order to thereby control the temperature of the polymer melt 2 to a certain temperature. The at least one temperature-control channel 45a and the at least one further temperature-control channel 45b of the particular roller cylinder $3_1, \ldots, 3_n$ are separated from one another and the particular fluid within these temperature-control channels 45a, 45b can be temperature-controlled differently. This allows a very precise temperature setting to be made. The polymer melt 2 naturally does not come into contact with the fluid. The temperature-control channels 45a, 45b have been clearly drawn in FIG. 3 only for better clarity. The polymer melt 2 does not escape from the temperature-control channels 45a, 45b.

For this purpose, a plurality of temperature sensors 35 are preferably used, which are arranged on different roller cylinders $3_1, \ldots, 3_n$ or between different roller cylinders $3_1, \ldots, 3_n$ and are designed to measure a temperature of the polymer melt 2 at different locations within the planetary roller extruder 3. Temperature sensors 35 can be used to measure the melt temperature of the polymer melt 2 or the steel temperature of the roller cylinders $3_1, \ldots, 3_n$. If the temperature of the roller cylinder $3_1, \ldots, 3_n$ deviates from the target temperature, only the temperature control must be adjusted. If the real melt temperature exceeds the permissible melt temperature, measures have to be taken to cool down the melt temperature before it leaves the wide-slot nozzle 5 or the flush valve, e.g. to stop heat supply via the heating and/or cooling arrangement (e.g. in the melt line, the melt filter and/or the wide-slot nozzle 5) or to stop the planetary roller extruder 3.

The control device 14 is designed, in the event that a temperature value of one or more the temperature sensors 35 exceeds a temperature reference value, to control the pump arrangement 50 and the temperature-control arrangement 51 in such a manner that the arrangement pumps the fluid faster and/or cools the fluid down further in the roller cylinder $3_1, \ldots, 3_n$ on which the temperature sensor 35 is arranged of which the temperature value has exceeded the temperature reference value, in order to cool down the polymer melt 2. The flow through the pump arrangement 50 preferably remains constant. Only the temperature of the fluid being pumped through the pump arrangement is changed. Additionally or alternatively the control device 14 is designed to stop the planetary roller extruder 3.

Additionally or alternatively, the control device 14 is also designed, in the event that a temperature value of one or more the temperature sensors 35 falls below a temperature reference value, to control the pump arrangement 50 and the temperature-control arrangement 51 in such a manner that the arrangement pumps and/or heats the fluid more slowly in the roller cylinder $3_1, \ldots, 3_n$ on which the temperature sensor 35 of which the temperature value has fallen below the temperature reference value is arranged, in order to heat the polymer melt 2. This allows very targeted closed-loop temperature control.

Thermal oil at temperatures of up to 300° C. can be pumped into at least one fluid channel 40a to the centre spindle 20 or into the temperature-control channels 45a or 45b of the roller cylinders $3_1, \ldots, 3_n$.

In the following, some features of the invention are described separately.

It is advantageous if the installation comprises the following feature:
  a region beginning from the filling opening 3a of the planetary roller extruder 3 to the inlet side 4a of the melt pump 4 is free of air openings such that air entrained in the polymer melt 2 is displaced from the polymer melt 2 when the pressure of the polymer melt builds up, and is pressed back towards the filling opening 3a and only there is degassed from the planetary roller extruder 3.

It is advantageous if the installation comprises the following feature:
  a nitrogen atmosphere is applied to the filling opening 3a.

It is advantageous if the installation comprises the following features:
  a plurality of further pressure sensors 31 are provided which are arranged on other roller cylinders $3_1, \ldots, 3_{n-1}$ or between the other roller cylinders $3_1, \ldots, 3_{n-1}$ and are designed to measure a pressure of the polymer melt 2 within the planetary roller extruder 3;
  the control device 14 is designed, at at least one measured pressure value of the at least one pressure sensor 30 which is above a threshold value:
    i) to control the drive apparatus 16 with respect to the speed of the centre spindle 20 in such a manner that said spindle reduces the speed thereof; and/or
    ii) to control the melt pump 4 with respect to the pump speed in such a manner that said pump increases the speed thereof.

It is advantageous if the installation comprises the following feature:
  the melt pump 4 can be electrically heated; or
  the melt pump 4 can be heated by means of thermal oil.

It is advantageous if the installation comprises the following feature:
  the pressure line 6 has a length of preferably less than 50 cm, 40 cm, 30 cm, 20 cm or less than 10 cm; and/or
  the pressure line 6 has a length of preferably more 2 cm, 5 cm, 10 cm, 15 cm, 25 cm, 35 cm or more than 45 cm.

It is advantageous if the use of the installation comprises the following feature:
  the liquid component consists of or comprises a solvent; and/or
  the liquid component comprises or consists of one or more the following agents:
    a) paraffin oil;
    b) hydrocarbons;
    c) petroleum hydrocarbons; and/or
    d) white mineral oil.

The invention is not restricted to the embodiments described. In the context of the invention, all of the described and/or depicted features can be combined with one another in any manner.

The invention claimed is:
1. Installation for producing a polymer melt for porous films having the following features:
  having a planetary roller extruder for producing a flowable polymer melt from thermoplastics;
  the planetary roller extruder has a filling opening and a discharge side for delivering the polymer melt;
wherein:
  a melt pump is provided;
  the discharge side of the planetary roller extruder is connected to a downstream inlet side of the melt pump for further conveying the polymer melt;
  the connection is in the form of:
  a pressure line having a length longer than 5 cm and shorter than 500 cm, and shielded from the ambient atmosphere;
  the planetary roller extruder and the melt pump are designed and/or can be driven in such a manner that the polymer melt is applied or can be transferred under pressure at the melt pump on the inlet side, wherein the pressure under which the polymer melt is applied at the inlet side of the melt pump is greater than 4 bar; and,
  to increase the pressure under which the plastic melt is applied or can be transferred to the input side of the melt pump, the melt pump is configured to reduce its pump rotational speed, so that the plastic melt builds up from the input side of the melt pump in the direction of the output side of the planetary roller extruder, this build-up working against the continuous material flow of the further plastic melt so that it causes an increase in pressure;

and a region beginning from the filling opening of the planetary roller extruder is free from air openings up to the inlet side of the melt pump, so that air dragged into the polymer melt is pushed out of said polymer melt when the pressure of the polymer melt is increased, and wherein the air is pushed in the direction of the filling opening of the planetary roller extruder and only then degassed from the planetary roller extruder.

2. Installation according to claim 1, wherein:

the pressure under which the polymer melt is applied or can be transferred at the inlet side of the melt pump is greater than 4 bar.

3. Installation according to claim 1, wherein:

in order to increase the pressure under which the polymer melt is applied or can be transferred at the inlet side of the melt pump, the melt pump is designed to reduce the pump speed thereof in such a manner that the polymer melt backs up from the inlet side of the melt pump towards the discharge side of the planetary roller extruder, the continuous material flow of the further polymer melt counteracting this backflow in such a manner that the pressure is increased.

4. Installation according to claim 1, wherein:

the filling opening is provided as a common filling opening for a polymer, in particular for a powdered polymer, and for fillers, in particular in the form of liquid components.

5. Installation according to claim 1, wherein:

a drive apparatus is provided for driving the planetary roller extruder;

the planetary roller extruder comprises n roller cylinders, having n≥1 and a toothed centre spindle;

the n roller cylinders are arranged adjacent to one another along their longitudinal axis and are screwed together and sealed off from one another;

each roller cylinder comprises an internally toothed cylindrical sleeve and m toothed planetary spindles, where m≥3 and is penetrated by the toothed centre spindle;

the centre spindle and the m planetary spindles are arranged inside the cylinder sleeve of the particular roller cylinder, the planetary spindles being arranged between the centre spindle and the cylinder sleeve;

the centre spindle can be driven by the drive apparatus, the centre spindle meshing with the planetary spindles, and also the planetary spindles meshing with the internally toothed cylinder sleeve, such that the m planetary spindles roll on the centre spindle and the cylinder sleeve by rotating the centre spindle;

the filling opening is arranged in the first roller cylinder and the discharge side is arranged in the nth roller cylinder.

6. Installation according to claim 5, wherein:

the toothing of the centre spindle, the cylinder sleeve and the planetary spindles is a 45° helical toothing, as a result of which a forward flow of the polymer melt is created and said melt can be simultaneously rolled out.

7. Installation according to claim 5, wherein:

a dosing arrangement is provided;

the dosing arrangement comprises:

a) at least one gravimetric dosing unit for a polymer; and b) a dosing pump arrangement having at least one dosing pump and having at least one injection arrangement for a liquid component;

the dosing arrangement is designed to dose the polymer and the liquid component and:

a) to discharge directly through the filling opening into the first roller cylinder, where the polymer and the liquid component can be mixed together; or b) to feed into a side feeder having one or two screw conveyor(s) in which mixing of the polymer and the liquid component occurs, the screw conveyor(s) being designed to discharge the mixture through the filling opening into the first roller cylinder.

8. Installation according to claim 7, wherein:

a first and a second reservoir for a first and a second liquid component are provided;

the dosing pump arrangement is connected or connectable to the first reservoir and/or to the second reservoir such that either the first liquid component and/or the second liquid component can be supplied to the filling opening; or a first and a second reservoir for a first and a second liquid component are provided;

the dosing pump arrangement comprises a first dosing pump and a second dosing pump, the first dosing pump being connected or connectable to the first reservoir and the second dosing pump being connected or connectable to the second reservoir such that either the first liquid component and/or the second liquid component can be supplied to the filling opening.

9. Installation according to claim 7, wherein:

the dosing arrangement comprises one or more further injection arrangements, said one or more further injection arrangements each being arranged along the planetary roller extruder, in particular at the transition region from one roller cylinder to another adjacent roller cylinder and being designed to inject an additional dosed amount of the liquid component into the planetary roller extruder.

10. Installation according to claim 7, wherein:

the dosing arrangement is designed to set the ratio of the amount of polymer and liquid component fed to the planetary roller extruder:

a) it being possible to add 80 to 50 parts by weight of the liquid component to 20 to 50 parts by weight of the polymer.

11. Installation according to claim 7, wherein:

at least one pressure sensor is provided which is arranged on the nth roller cylinder or between the nth roller cylinder and the inlet side of the melt pump and is designed to measure a pressure of the polymer melt;

a control device is provided which is designed, at a measured pressure value which:

a) lies below a reference value:

i) to control the dosing arrangement with respect to the output amount thereof in such a manner that said arrangement increases the output amount thereof; and/or ii) to control the drive apparatus with respect to the speed of the centre spindle in such a manner that said drive apparatus increases the speed thereof; and/or iii) to control the melt pump with respect to the pump speed in such a manner that said pump reduces the speed thereof;

such that the pressure measured by the at least one pressure sensor approximately reaches the predetermined reference value;

and/or
b) lies above a reference value:
  i) to control the dosing arrangement with respect to the output amount thereof in such a manner that said arrangement reduces the output amount thereof; and/or
  ii) to control the drive apparatus with respect to the speed of the centre spindle in such a manner that said spindle reduces the speed thereof; and/or
  iii) to control the melt pump with respect to the pump speed in such a manner that said pump increases the speed thereof;
such that the pressure measured by the at least one pressure sensor approximately reaches the predetermined reference value.

12. Installation according to claim 5, wherein:
the centre spindle:
  a) is constructed in one piece and penetrates all n roller cylinders; or
  b) comprises a plurality of individual centre spindle segments, which are connected to one another along their longitudinal axis for conjoint rotation to form the centre spindle.

13. Installation according to claim 5, wherein:
the planetary spindles within most of the roller cylinders are arranged exclusively within the particular roller cylinder and do not extend from this roller cylinder into adjacent roller cylinders; and/or
the first two adjacent roller cylinders comprise continuous planetary spindles which are arranged in both the first and the second roller cylinder.

14. Installation according to claim 5, wherein:
a toothed intermediate ring is inserted between the first two adjacent roller cylinders;
the toothed intermediate ring has the shape of the internal toothing of the cylinder sleeve.

15. Installation according to claim 5, wherein:
at least from the second roller cylinder onwards, a dispersion ring is arranged between each two adjacent roller cylinders;
the dispersion ring at the transition from the second roller cylinder to the third roller cylinder has a larger or smaller annular gap than a dispersion ring at the transition from the n−1th roller cylinder to the nth roller cylinder; or
the dispersion ring at the transition from the second roller cylinder to the third roller cylinder has an annular gap of the same size as a dispersion ring at the transition from the n−1th roller cylinder to the nth roller cylinder.

16. Installation according to claim 5, wherein:
the toothing of the centre spindle is interrupted at the transition from one roller cylinder to an adjacent roller cylinder; and/or
the toothing of the planetary spindles in at least one, a plurality of or all of the roller cylinders is interrupted several times, as a result of which the cross mixing in the particular roller cylinder increases.

17. Installation according to claim 5, wherein:
the centre spindle is penetrated completely or along the predominant length thereof by at least one fluid channel;
a pump arrangement and a temperature-control arrangement are provided and are designed to control the temperature of a fluid to a certain temperature and to conduct said fluid through the at least one fluid channel in order to thereby control the temperature of the polymer melt to a certain temperature.

18. Installation according to claim 5, wherein:
the roller cylinders comprise at least one temperature-control channel;
a pump arrangement and a temperature-control arrangement are provided and are designed to control the temperature of a fluid to a certain temperature and to conduct said fluid through the at least one temperature-control channel of the particular roller cylinder to thereby control the temperature of the polymer melt to a certain temperature;
each of the at least one temperature-control channels of the roller cylinders are separated from one another and can be temperature-controlled differently, the temperature of a fluid in the first roller cylinder being higher or lower than the temperature of a fluid in the nth roller cylinder.

19. Installation according to claim 18, wherein:
one, a plurality of or all of the roller cylinders comprise at least one further temperature-control channel;
the at least one temperature-control channel and the at least one further temperature-control channel are arranged inside the particular roller cylinder so as to be offset from one another in the longitudinal direction and/or in the circumferential direction of the particular roller cylinder;
the pump arrangement and the temperature-control arrangement are further designed to control the temperature of a fluid to a certain temperature and to conduct said fluid through the at least one further temperature-control channel of the particular roller cylinder in order to thereby control the temperature of the polymer melt to a certain temperature;
the at least one temperature-control channel and the at least one further temperature-control channel of the particular roller cylinder are separated from one another and the particular fluid within these temperature-control channels can be temperature-controlled differently.

20. Installation according to claim 18, wherein:
a plurality of temperature sensors are provided which are arranged on different roller cylinders or between different roller cylinders and are designed to measure a temperature of the polymer melt at different locations within the planetary roller extruder;
a control device is designed, in the event that a temperature value of one or more of the temperature sensors:
  a) exceeds a temperature reference value, to control the pump arrangement and the temperature-control arrangement in such a manner that the arrangement pumps in and/or cools down the fluid more quickly in the roller cylinder on which the temperature sensor is arranged of which the temperature value has exceeded the temperature reference value, in order to cool down the polymer melt;
and/or
  b) falls below a temperature reference value, to control the pump arrangement and the temperature-control arrangement in such a manner that the arrangement pumps in and/or heats the fluid more slowly in the roller cylinder on which the temperature sensor is arranged of which the temperature value has fallen below the temperature reference value, in order to heat the polymer melt.

21. Installation according to claim 1, wherein:
a wide-slot nozzle is provided, which is connected to a discharge side of the melt pump;

a flush valve and/or a melt filter are arranged between a discharge side of the melt pump and the wide-slot nozzle;
a cooling roller is provided, which is arranged below the wide slot nozzle such that polymer melt leaving the wide-slot nozzle hits the cooling roller.

\* \* \* \* \*